(12) United States Patent
Atallah

(10) Patent No.: US 7,973,441 B2
(45) Date of Patent: Jul. 5, 2011

(54) MAGNETIC GEAR

(75) Inventor: Kais Atallah, Sheffield (GB)

(73) Assignee: Magnomatics Limited, Sheffield (GB)

( * ) Notice: Subject to any disclaimer, the term of this patent is extended or adjusted under 35 U.S.C. 154(b) by 0 days.

(21) Appl. No.: 12/305,043

(22) PCT Filed: May 11, 2007

(86) PCT No.: PCT/GB2007/001734
§ 371 (c)(1),
(2), (4) Date: May 28, 2009

(87) PCT Pub. No.: WO2007/144556
PCT Pub. Date: Dec. 21, 2007

(65) Prior Publication Data
US 2010/0207472 A1     Aug. 19, 2010

(30) Foreign Application Priority Data

Jun. 16, 2006   (GB) .................................. 0611965.5

(51) Int. Cl.
*H02K 7/06*    (2006.01)

(52) U.S. Cl. .......................................... 310/103; 310/83
(58) Field of Classification Search .................. 130/103; 310/83
See application file for complete search history.

(56) References Cited

U.S. PATENT DOCUMENTS

| | | | | |
|---|---|---|---|---|
| 5,013,949 | A * | 5/1991 | Mabe, Jr. ........................ | 310/83 |
| 5,569,111 | A * | 10/1996 | Cho et al. ....................... | 475/149 |
| 6,975,053 | B2 * | 12/2005 | Tsujimoto ...................... | 310/103 |
| 7,746,200 | B2 * | 6/2010 | Meinherz et al. .............. | 335/185 |
| 2004/0021384 | A1 * | 2/2004 | Six ................................ | 310/103 |
| 2007/0107685 | A1 * | 5/2007 | Farah .......................... | 123/90.31 |

FOREIGN PATENT DOCUMENTS

| | | |
|---|---|---|
| DE | 4428441 | 2/1995 |
| JP | 2003284317 | 10/2003 |

* cited by examiner

*Primary Examiner* — Nguyen N Hanh
(74) *Attorney, Agent, or Firm* — Hartman & Hartman, P.C.; Gary M. Hartman; Domenica N. S. Hartman

(57) ABSTRACT

Embodiments of the present invention relate to magnetic gears comprising a pair of rotors magnetically coupled in a geared manner via a magnetic space harmonic generated as a consequence of varying an air gap between sets of permanent magnets.

10 Claims, 15 Drawing Sheets

US 7,973,441 B2

MAGNETIC GEAR

FIELD OF THE INVENTION

Embodiments of the present invention relate to magnetic gears.

BACKGROUND TO THE INVENTION

Mechanical gearboxes are extensively used to match the operating speed of prime-movers to the requirements of their loads for both increasing rotational speed such as, for example, in a wind-powered generator or reducing rotational speed such as, for example, in an electric-ship propulsion arrangement. It is usually more cost and weight effective to employ a high-speed electrical machine in conjunction with a mechanical gearbox to achieve requisite speed and torque characteristics. However, white such a high-speed electrical machine in conjunction with a mechanical gearbox allows high system torque densities to be realised, such mechanical gearboxes usually require lubrication and cooling. Furthermore, reliability can also be a significant issue. Consequently, direct drive electrical machines are employed in applications where a mechanical gearbox cannot be used.

Several techniques of achieving magnetic gearing, using permanent magnets, are known within the art. For example, FIG. 1 shows the most commonly used topology for magnetic gears. It can be appreciated that FIG. 1 shows a magnetic gear 100 comprising a first, high-speed, rotor 102 bearing a plurality of permanent magnets 104 that is magnetically coupled, in a geared manner, to a second, low speed, rotor 106 comprising a number of permanent magnets 108. A significant disadvantage of the magnetic gear 100 shown in FIG. 1 is that the topology suffers from a very poor utilisation of the permanent magnets since very few of the permanent magnets simultaneously contribute to torque transmission at any given time. The very poor torque transmission capability has limited the use of magnetic gearing.

The problem associated with the magnetic gear 100 of FIG. 1 is solved by the magnetic gear 200 shown in FIG. 2. FIG. 2 shows a rotary magnetic gear 200 comprising a first or inner rotor 202, a second or outer rotor 204 and a number of pole pieces 206, otherwise known as an interference or an interference means. The first rotor 202 comprises a support 208 bearing a respective first number of permanent magnets 210. In the illustrated magnetic gear, the first rotor 202 comprises 8 permanent magnets or 4 pole-pairs arranged to produce a spatially varying magnetic field. The second rotor 204 comprises a support 212 bearing a respective second number of permanent magnets 214. The second rotor 204 comprises 46 permanent magnets or 23 pole-pairs arranged to produce a spatially varying field. The first and second numbers of permanent magnets are different. Accordingly, there will be little or no useful direct magnetic coupling or interaction between the permanent magnets 210 and 214 such that rotation of one rotor will not cause rotation of the other rotor.

The pole pieces 206 are used to allow the fields of the permanent magnets 210 and 214 to interact in a geared manner. The pole pieces 206 modulate the magnetic fields of the permanent magnets 210 and 214 so they interact to the extent that rotation of one rotor will induce rotation of the other rotor in a geared manner. Rotation of the first rotor 202 at a speed $\omega_1$ will induce rotation of the second rotor 204 at a speed $\omega_2$ where $\omega_1 > \omega_2$ and visa versa.

However, the magnetic gear topology shown in FIG. 2 has the disadvantages that it is unsuitable for high gear ratios, it is relatively complex and has an unfavourable torque density especially when higher gear ratios are required.

It is an object of embodiments of the present invention to at least mitigate one or more of the above problems of the prior art.

SUMMARY OF EMBODIMENTS OF THE INVENTION

Accordingly, a first aspect of embodiment of the present invention provides a magnetic gear comprising first and second moveable members having associated first and second pluralities of permanent magnets respectively arranged such that the first and second pluralities of permanent magnets are separated by a varying distance that, in response to relative movement of the first and second moveable members, magnetically couples the first and second pluralities of permanent magnets in a geared manner via a common magnetic harmonic generated as a consequence of the relative movement.

Advantageously, the magnetic gears according to embodiments of the present invention exhibit significant advantages, in terms of simplicity and torque density, especially when higher gear ratios are required as compared to the prior art.

Other embodiments are described below and claimed in the claims.

BRIEF DESCRIPTION OF THE DRAWINGS

Embodiments of the present invention will now be described, by way of example only, with reference to the accompanying drawings in which.

DETAILED DESCRIPTION OF PREFERRED EMBODIMENTS

Figure 1:
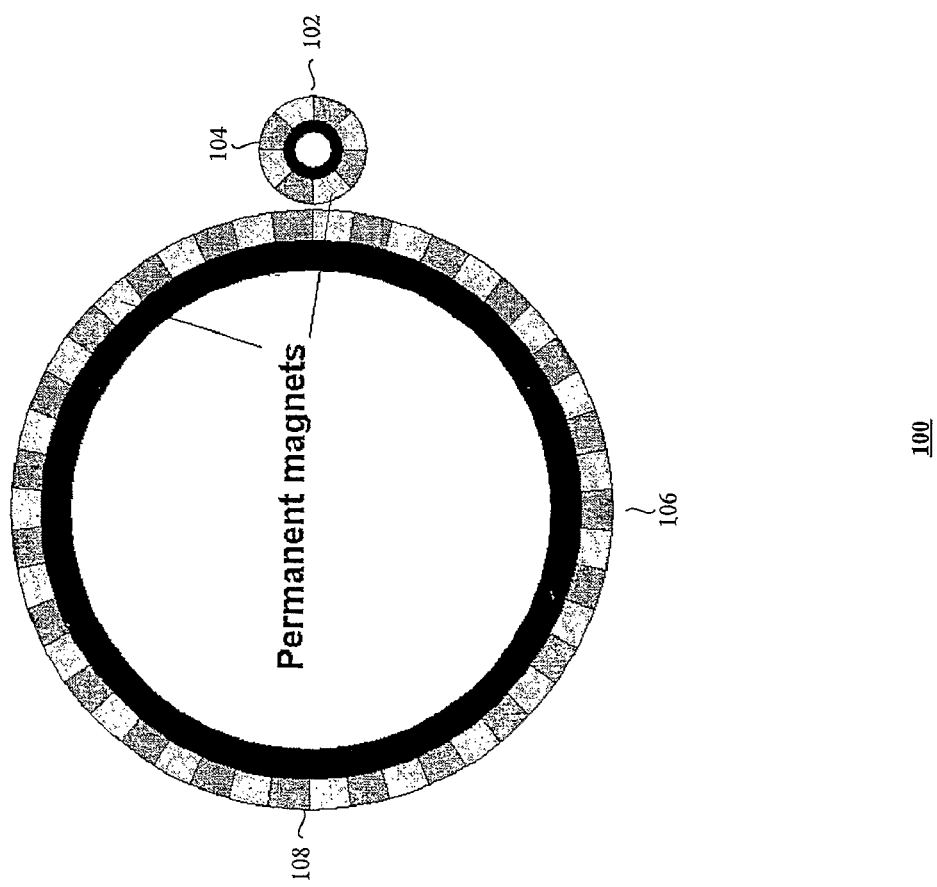
FIG. 1 shows a conventional magnetic gear.
Figure 2:
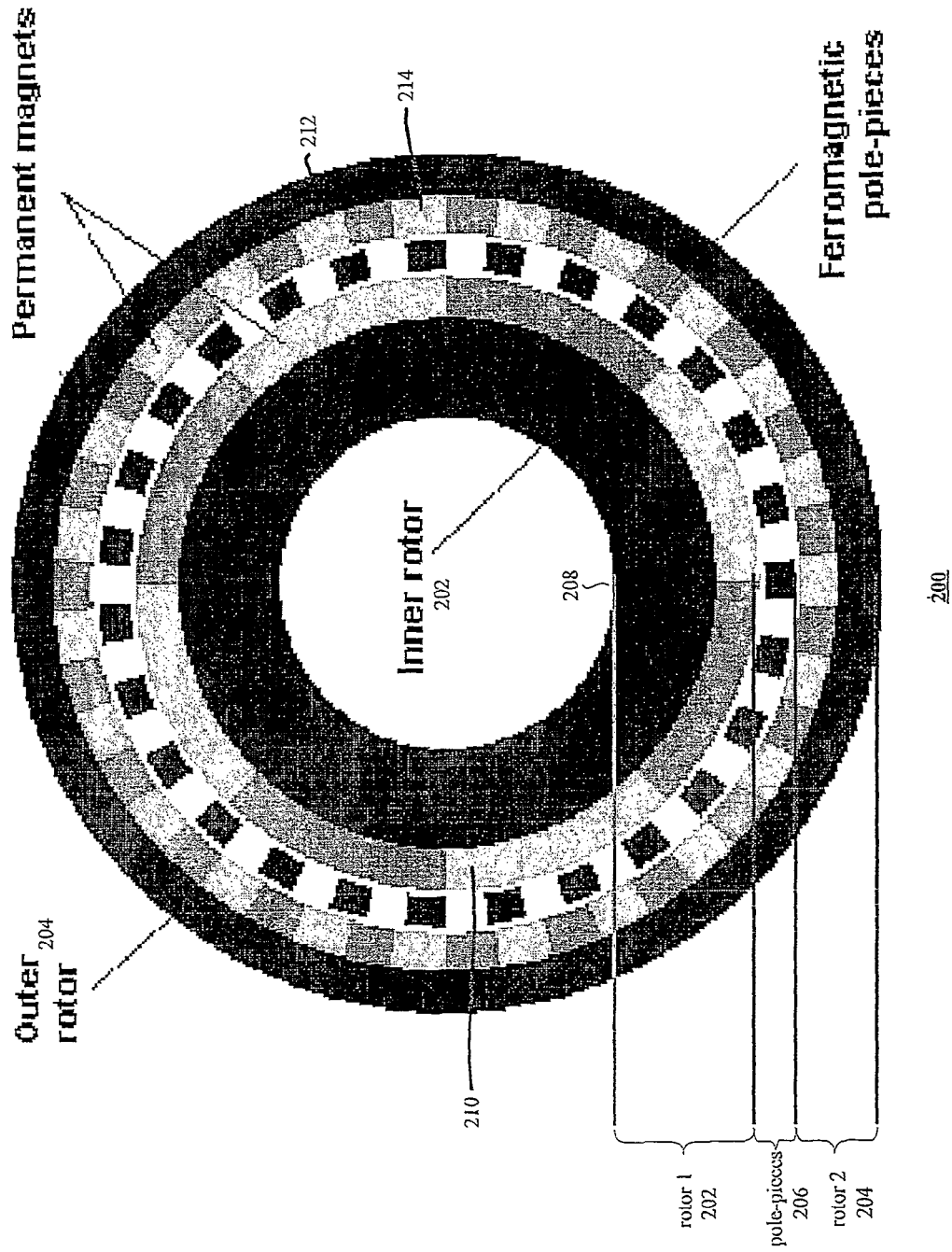
FIG. 2 shows a further conventional magnetic gear.
Figure 3:
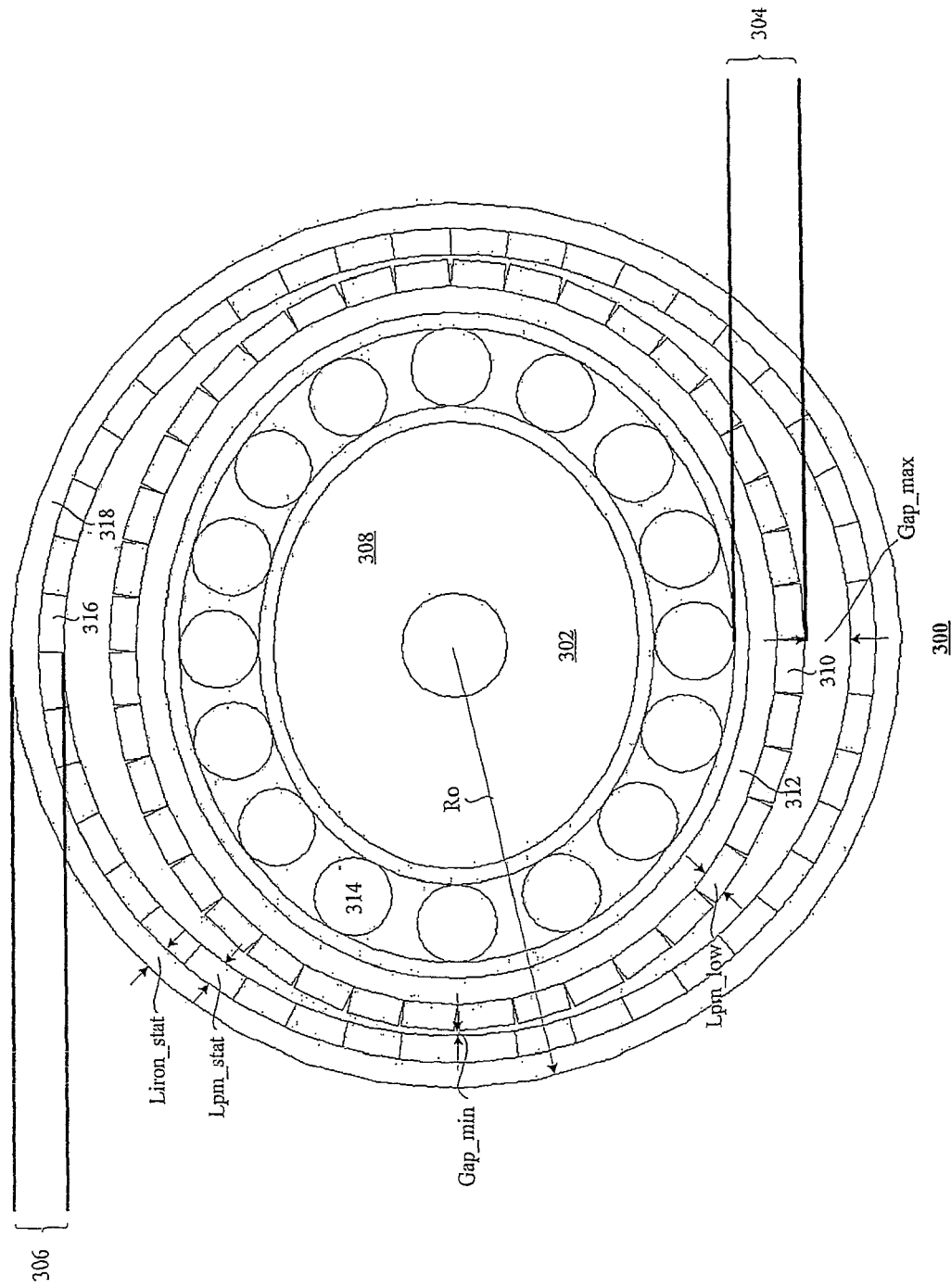
FIG. 3 shows a magnetic gear according to a first embodiment.

FIG. 3 shows a magnetic gear 300 according to a first embodiment. The magnetic gear 300 comprises an inner rotor 302, an outer rotor 304 and a stator 306. The inner rotor 302 comprises a non-cylindrical shaft 308 arranged to rotate about an axis (not shown). The outer rotor 304 comprises a number of permanent magnets 310 mounted on a flexible substrate 312. A plurality of bearings 314 are disposed between the inner rotor 302 and the outer rotor 304 to support relative rotation between the inner 302 and outer 304 rotors. The stator 306 comprises a plurality of permanent magnets 316, mounted on a substrate 318, that are magnetically coupled to the permanent magnets 310 of the outer rotor 304 to produce a geared rotation between the inner 302 and outer 304 rotors using the above described principles, that is, the circumference of the inner rotor is at least one of shaped and rotated at a predetermined speed to produce harmonics that couple the permanent magnets 310 of the rotor 304 to the permanent magnets 316 of the stator 306, that is, selected pole-pairs of the outer rotor permanent magnets are coupled to corresponding pole-pairs of the stator permanent magnets.

Preferably, the inner rotor 302 is a high-speed rotor. The high-speed rotor 302 is non-circular. The high-speed rotor 302, also known as a waveform generator, is, as indicated above, shaped so as to have a predetermined profile. In the embodiment illustrated, the waveform generator 302 has a sinusoidal profile having a radius, r, measured relative to an axis of the shaft, given by $$r = r_{av} + r_b \cos(2\theta) \quad (1)$$

where $r_{av}$ is the average radius and $r_b$ is the maximum deviation from the average. It is worth noting that although for the embodiment shown in FIG. 3 is profile given by equation (1) is adopted any profile which could be approximated by $r = r_{av} + r_b \cos(nn\theta)$, where nn is an integer would work. Therefore, the flux-density due to the low-speed rotor magnets 310 can be written as:

$$B = B_m \cos(pp\theta)[\lambda_0 + \lambda_1 \cos(2\theta)] \quad (2)$$

$$= B_m \cos(pp\theta)\lambda_0 + \frac{1}{2} B_m \lambda_1 \cos((pp+2)\theta) +$$

$$\frac{1}{2} B_m \lambda_1 \cos((pp-2)\theta)$$

Therefore, harmonics with pole-pairs of (pp+2) and (pp-2) are created that can interact with the stator magnets 316.

Gear Ratio

Writing equation (2) as a function of time gives $$B = B_m \cos(pp(\theta - \omega_{ls}t))[\lambda_0 + \lambda_1 \cos(2(\theta - \omega_w t))] \quad (3)$$

$$= \ldots + B_m \lambda_1 \cos(pp(\theta - \omega_{ls}t))\cos(2(\theta - \omega_w t))$$

$$= \ldots + \frac{B_m \lambda_1}{2} \cos[(pp-2)\theta + (2\omega_w - pp\omega_{ls})t] +$$

$$\frac{B_m \lambda_1}{2} \cos[(pp+2)\theta - (2\omega_w + pp\omega_{ls})t]$$

where $\omega_{ls}$, is the speed of the low speed rotor 304 and $\omega_w$ is the speed of the high speed rotor 302 (wave-form generator)

Therefore, in order for the harmonic of order (pp+2) to couple with the static field of the stator magnets 316, the following relationship between the rotor speeds must hold:

$$\omega_{ls} = -\frac{2\omega_w}{pp} \quad (4)$$

If the gear is designed with q=(pp−2) pole-pairs on the stator 306, the relationship, expressed in terms of such pole-pairs, between the rotor speeds becomes:

$$\omega_{ls} = +\frac{2\omega_w}{pp} \quad (5)$$

It should further be noted that the magnets 310 on the low-speed rotor 304 rotate with respective, different, speeds at each moment in time due to their different positions on the sinusoidal circumference or profile of the high-speed rotor 302. Therefore, $\omega_{ls}$ represents the average rotational speed of all magnets 310 of the low speed rotor 304.

There are a number of parameters associated with the magnetic gear 300 shown in FIG. 3. It should be noted that the flexible or low speed rotor 304 comprises a number of pole-pairs, pp. Secondly, the stator 306 comprises a number of pole-pairs, qq. Thirdly, the stator 306 has a predetermined outer radius, Ro. Fourthly, the magnets 316 on the stator 306 have a predetermined radial thickness, Lpm_stat. The magnets 310 of the low speed rotor 304 have a predetermined radial thickness, Lpm_low. Due to the noncircular shape of the high-speed rotor 302, the radial gap between the permanent magnets 310 of the low speed rotor 304 and the permanent magnets 316 of the stator 306 varies. In the embodiment illustrated, the radial air gap varies from a minimum, Gap_min, to a maximum, Gap_max. Fifthly, the back-iron 314 of the stator 306 has a predetermined radial length or thickness, Liron_stat. The dimensions of the above parameters for an embodiment of the harmonic gear 300 may be as given in table 1 below.

TABLE 1

| Dimensions of harmonic gear in FE predictions | |
|---|---|
| Outer radius, Ro | 85 mm |
| Minimal length of air-gap, gap_min | 1 mm |
| Length of back-iron on stator, Liron_stat | 5 mm |
| Minimal Length of back-iron on low-speed rotor, Liron_low | 5 mm |
| Magnet thickness on stator, Lpm_stat | 5 mm |
| Magnet thickness on low-speed rotor, Lpm_low | 5 mm |

The number of pole-pairs, qq, on the stator 306 must be equal to (pp+2) or (pp−2), as has been deduced from equation (2), to produce torque between the stator and low-speed rotor magnets. To demonstrate this further, FIG. 4 shows a graph 400 of the variation of normal flux density, which is due to the low-speed rotor magnets 312, through or at the centre of the stator magnets 316 with circumferential position for an embodiment of a magnetic gear 300 with pp=20 and gap_max=9.5 mm.

Figure 4:
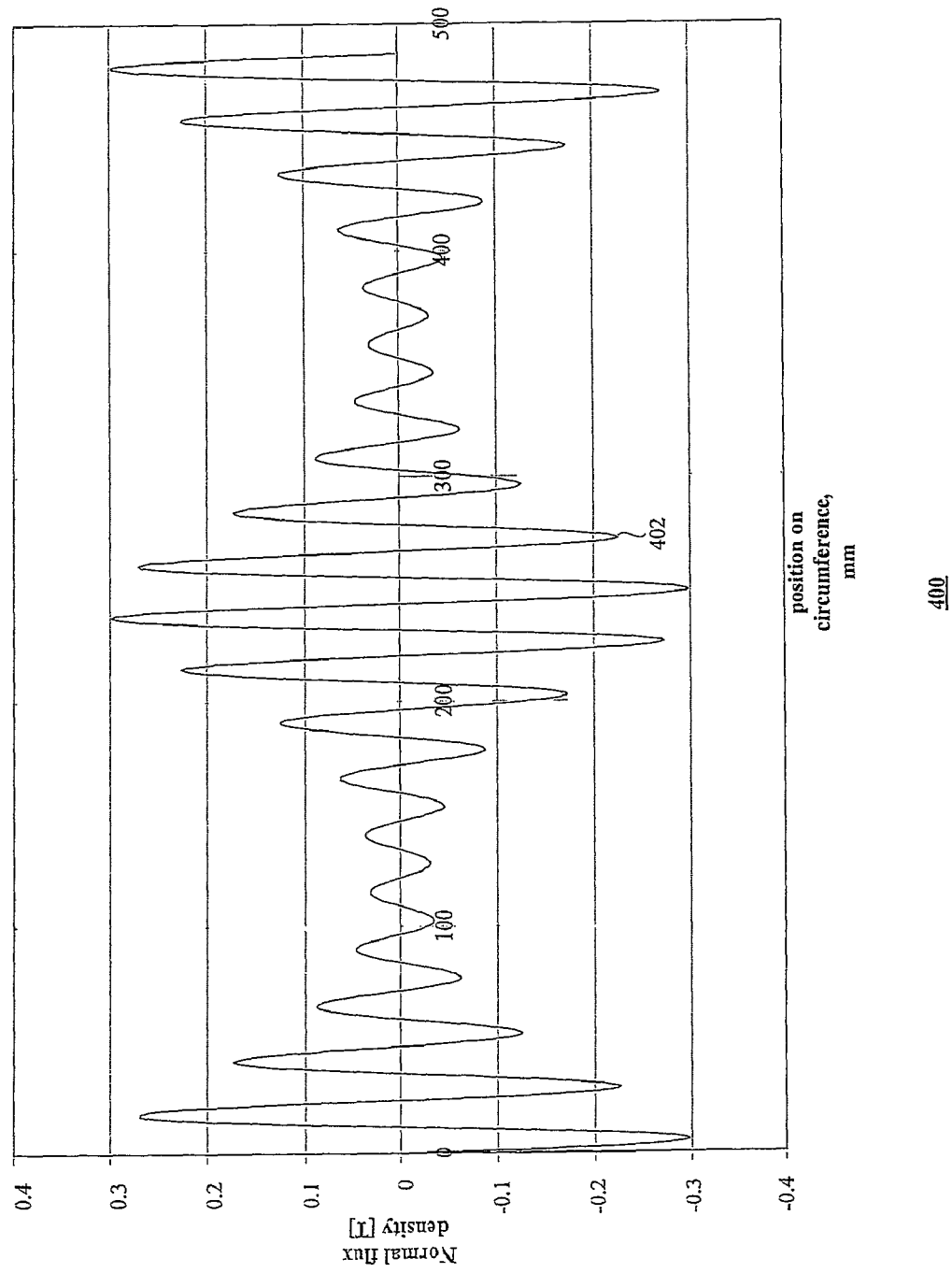
FIG. 4 shows a graph of variation in normal flux density with circumference position of the embodiment shown in FIG. 3.
Figure 5:
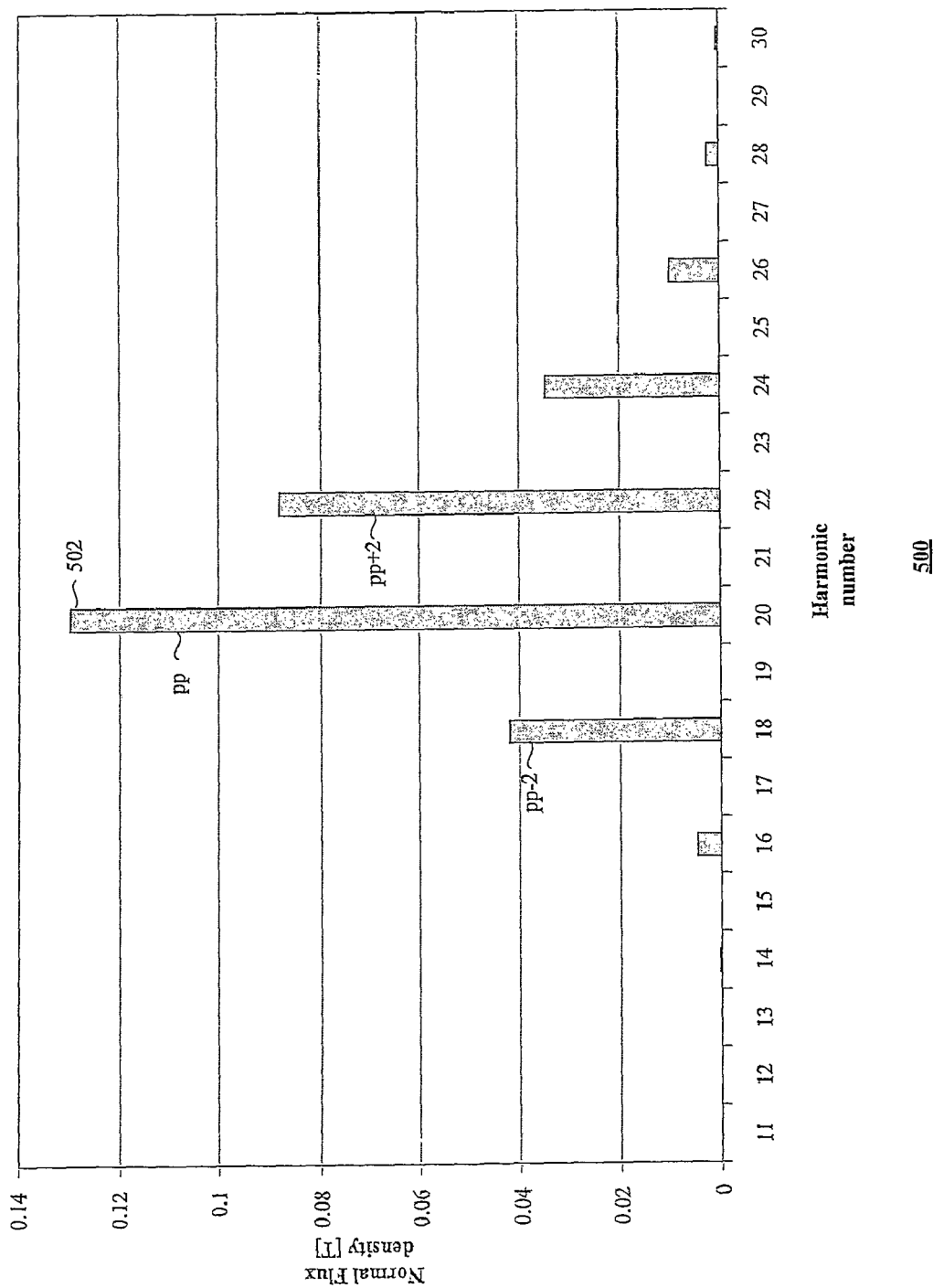
FIG. 5 illustrates a harmonic spectrum of the waveform shown in FIG. 4.

FIG. 5 shows a harmonic spectrum 500 of the waveform 402 shown in FIG. 4. It can be seen from the harmonic spectrum 500 that the (pp+2) harmonic 502 has the largest flux density amplitude. Therefore, an embodiment of a magnetic gear with qq=(pp+2) stator pole-pairs will produce the maximum torque for a low-speed rotor having pp pole-pairs.

Table 2 compares predicted torques for embodiments of the gear when the stator has qq=(pp−2)=18 and qq=(pp+2)=22 pole-pairs.

TABLE 2

Comparison between predicted torque when stator has (pp + 2) and (pp − 2) pole-pairs

|  | qq = (pp − 2) = 18 | qq = (pp − 2) = 22 |
|---|---|---|
| Torque per meter | 1170 Nm | 3020 Nm |

FIGS. 6 to 9 show various magnetic gears according to embodiments of the present invention. The embodiments have the parameters as described above with reference to table 1 but with different respective values of gap_max.

Figure 6:
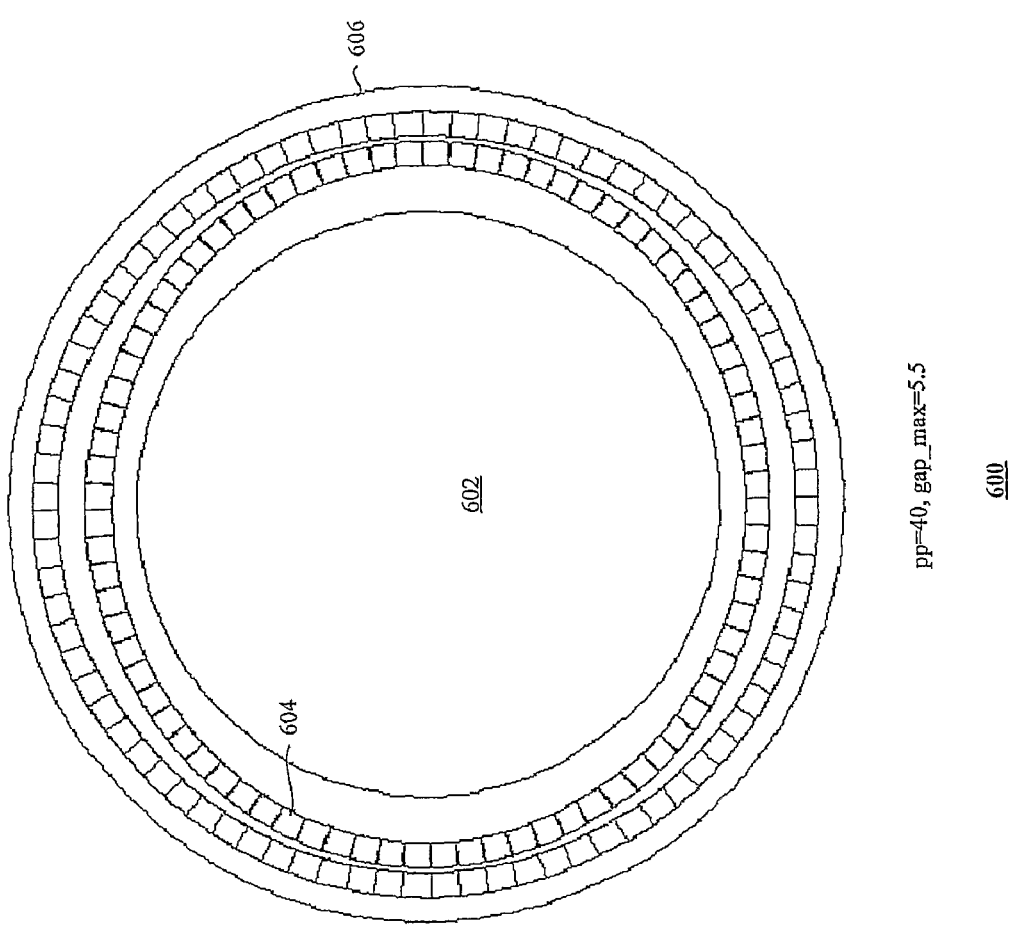
FIG. 6 depicts a magnetic gear according to a further embodiment.

Referring to FIG. 6, there is shown an embodiment of a magnetic gear 600 comprising a first rotor 602, a second rotor 604 and a stator 606. The second rotor 604 comprises 40 pole pairs. The stator 606 comprises 42 pole-pairs and the maximum air gap is 5.5 mm.

Figure 7:
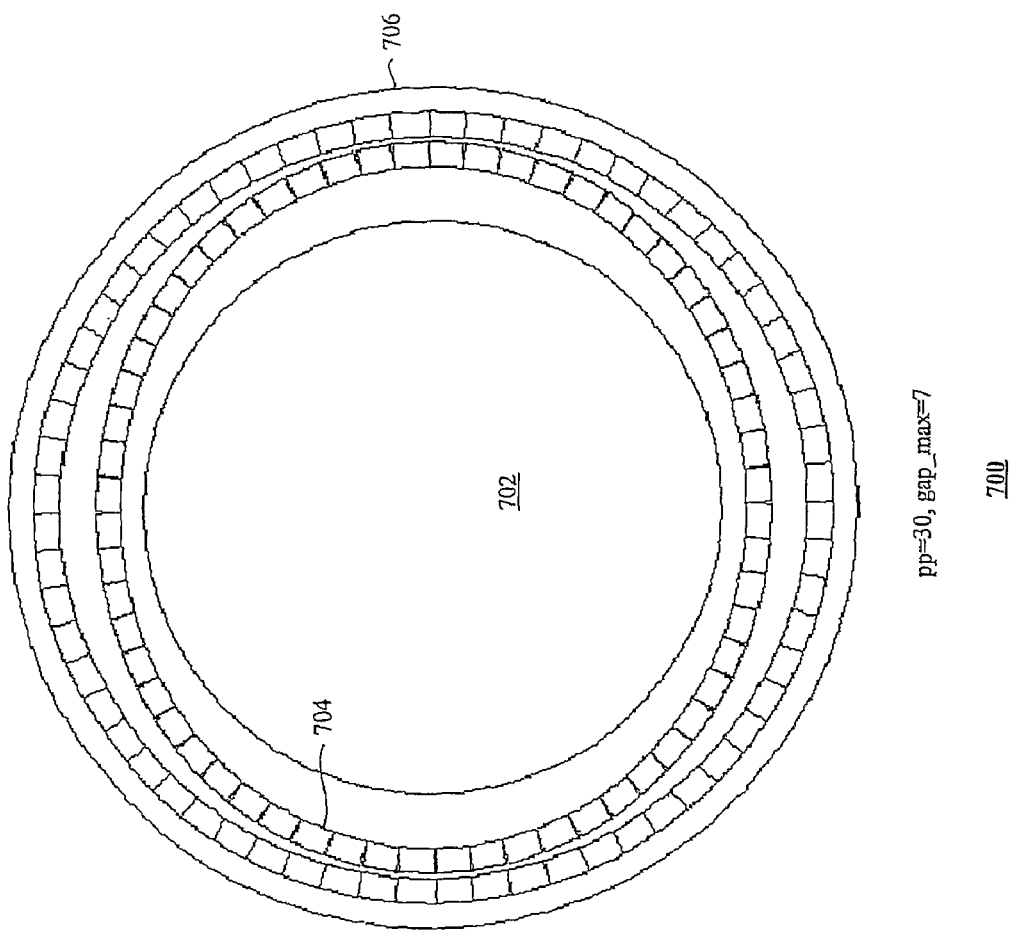
FIG. 7 shows another embodiment of a magnetic gear.

Referring to FIG. 7, there is shown an embodiment of a magnetic gear 700 comprising a first rotor 702, a second rotor 704 and a stator 706. The second rotor 704 comprises 30 permanent magnets. The stator 706 comprises 32 pole-pairs and the maximum air gap is 7 mm.

Figure 8:
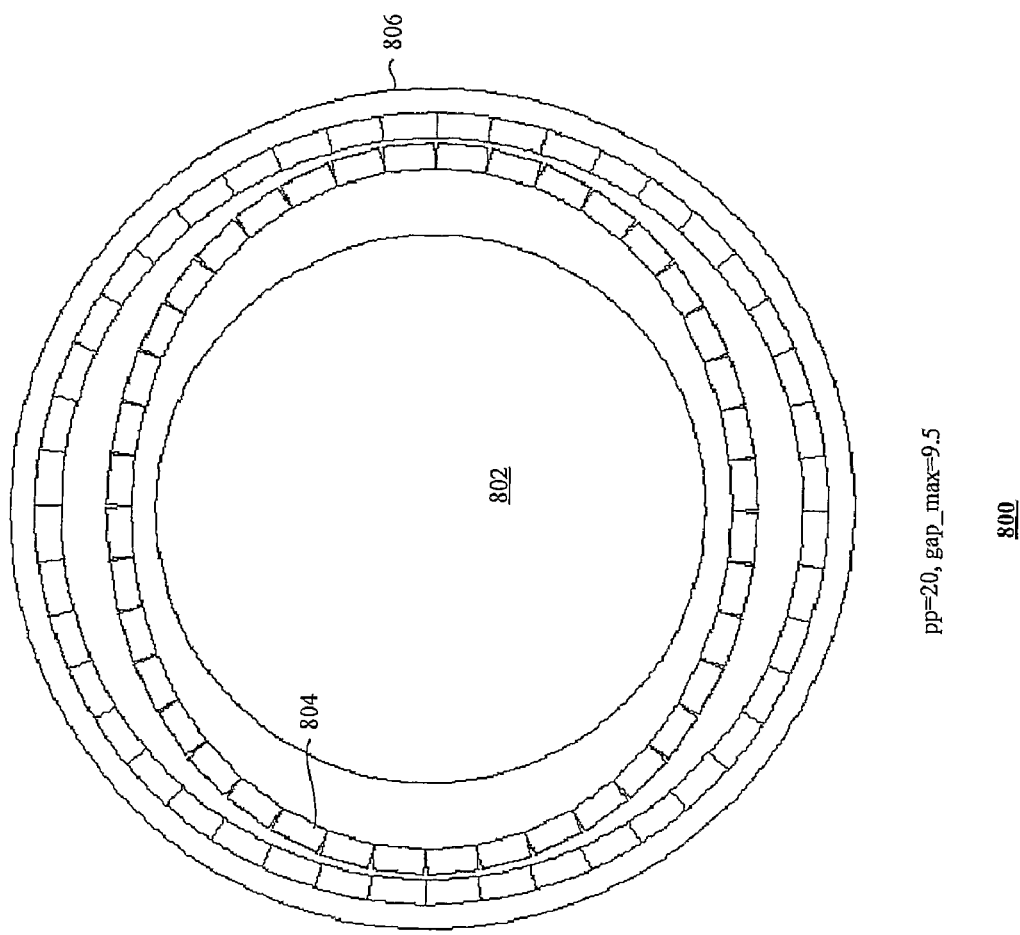
FIG. 8 illustrates yet another embodiment of a magnetic gear.

Referring to FIG. 8, there is shown an embodiment of a magnetic gear 800 comprising a first rotor 802, a second rotor 804 and a stator 806. The second rotor 804 comprises 40 pole pair. The stator 806 comprises 22 pole-pairs and the maximum air gap is 9.5 mm. This arrangement is the same as that described with reference to FIG. 3.

Figure 9:
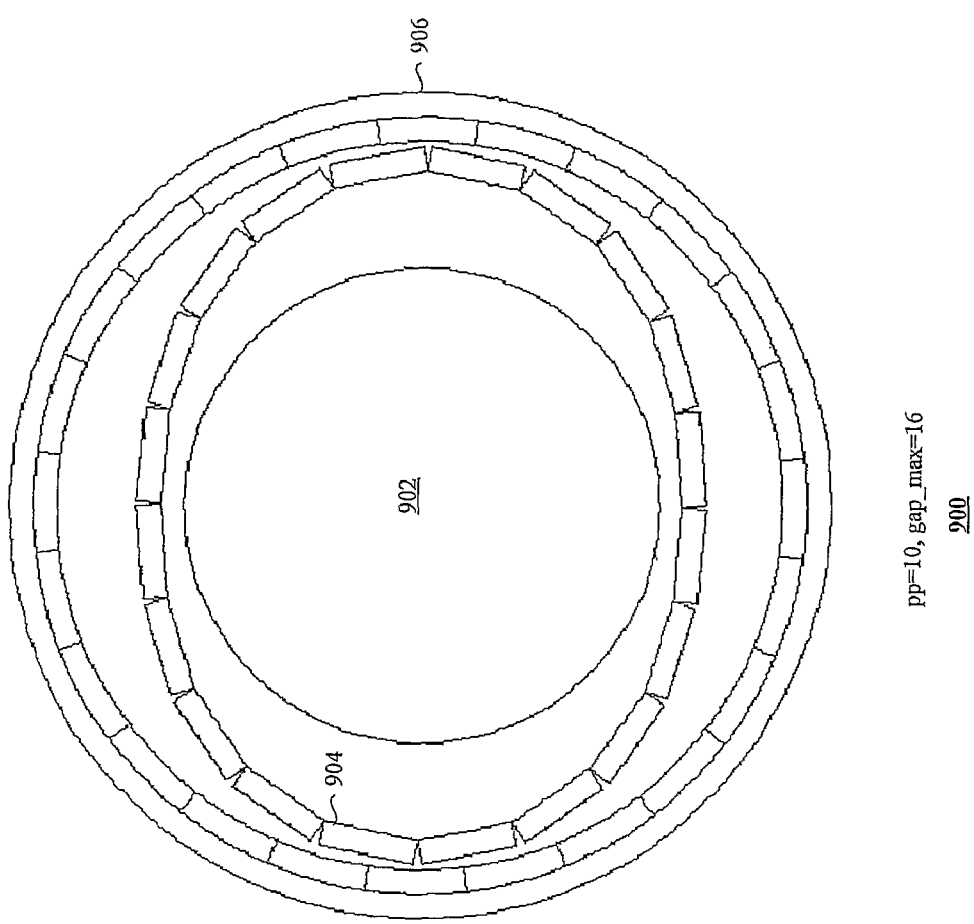
FIG. 9 depicts still another embodiment of a magnetic gear.

Referring to FIG. 9, there is shown an embodiment of a magnetic gear 900 comprising a first rotor 902, a second rotor 904 and a stator 906. The second rotor 904 comprises 10 pole pairs. The stator 906 comprises 12 pole-pairs and the maximum air gap is 16 mm.

Figure 10:
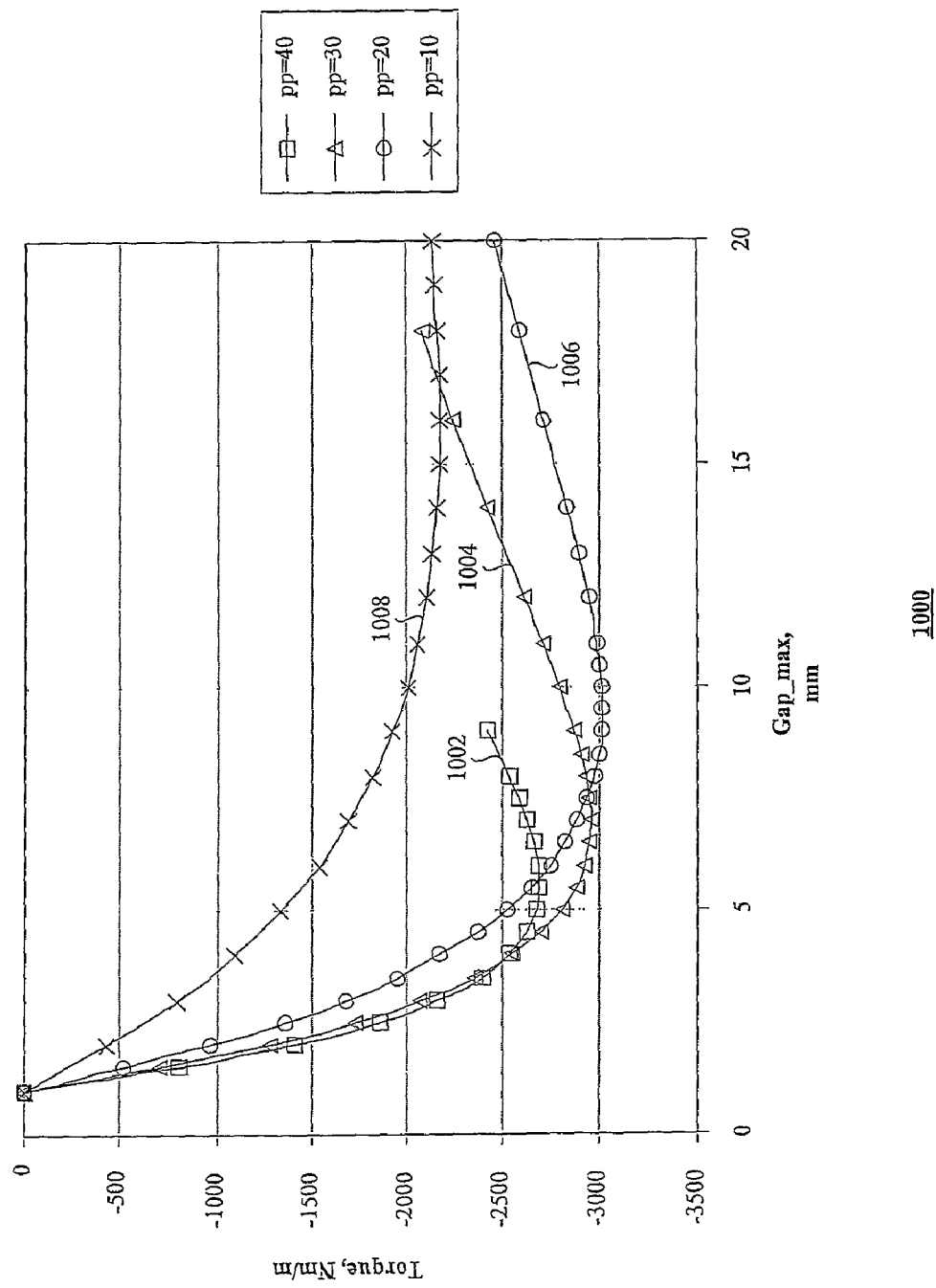
FIG. 10 shows a graph of variation of pull-out torque with maximum air gap per metre of axial length for embodiments of the present invention.

FIG. 10 illustrates a graph 1000 showing the variation of pull-out torque with maximum air gap per metre of axial length for the embodiments described with reference to FIGS. 6 to 9. A first curve 1002 illustrates the torque versus maximum air gap performance for the embodiment described with reference to FIG. 6. A second curve 1004 illustrates the torque versus maximum air gap performance for the embodiment described with reference to FIG. 7. A third curve 1006 illustrates the torque versus maximum air gap performance for the embodiment described with reference to FIG. 3 or 8. A fourth curve 1008 illustrates the torque versus maximum air gap performance for the embodiment described with reference to FIG. 9.

Figure 11:
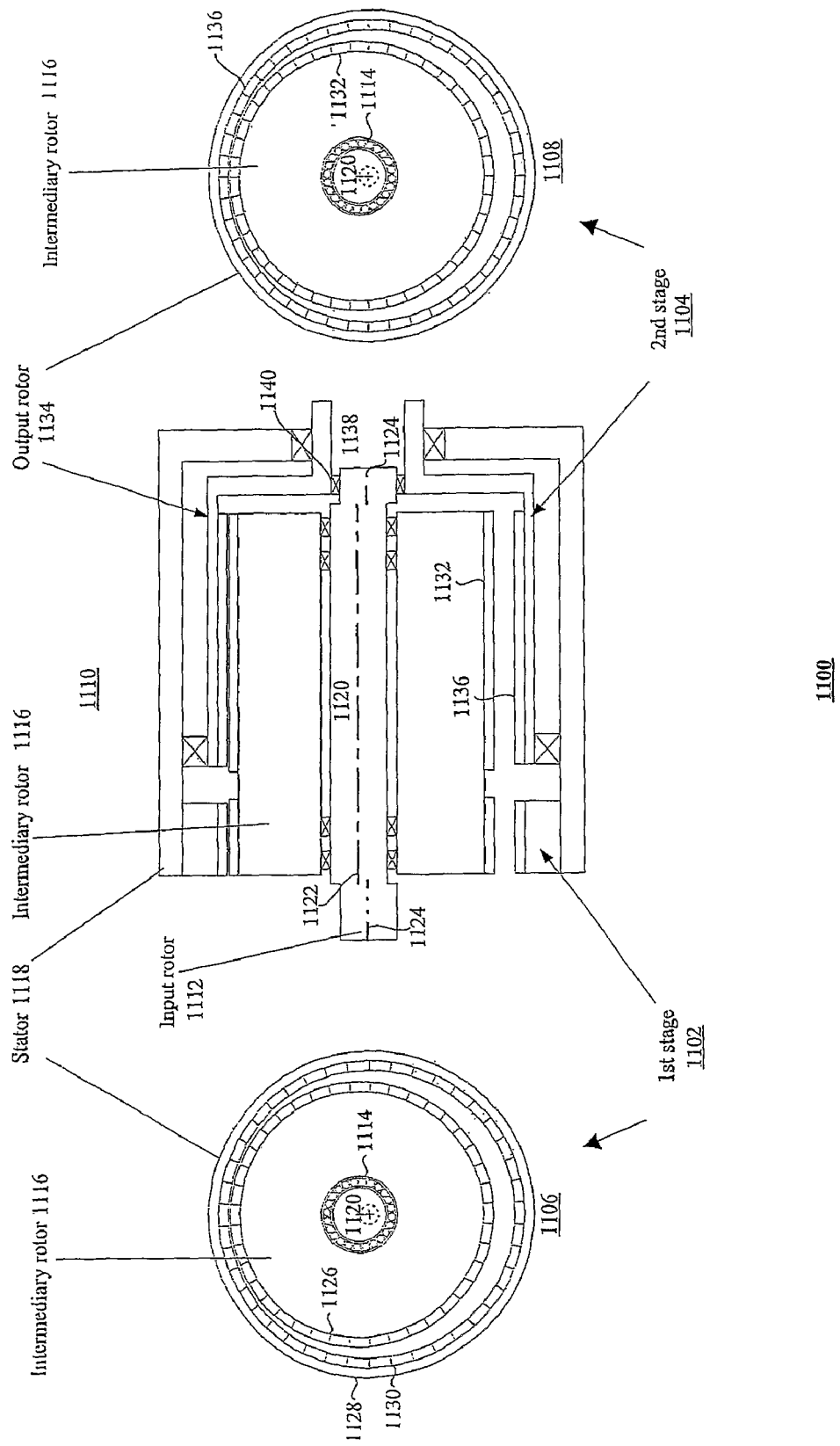
FIG. 11 shows a preferred embodiment of a magnetic gear.

Referring to FIG. 11, there is shown a magnetic gear 1100 according to an embodiment having non-coaxial or eccentric rotors that rotate about respective axes, such that one axis orbits another axis.

The magnetic gear 1100 shown in FIG. 11 comprises first 1102 and second 1104 stages. The magnetic gear 1100 is illustrated using two end views 1106 and 1108 and a cross-sectional-axial view 1110.

The first stage 1102 comprises an input rotor 1112 having mounted thereon, via bearings 1114, an inner or first rotor 1116, also known as an intermediary rotor. The first stage 1102 also comprises a stator 1118. It can be appreciated that the input rotor 1112 is coupled, in an eccentric manner, to a central shaft 1120. The intermediary rotor 1116 comprises a plurality of permanent magnets 1126. The stator 1118 comprises a soft magnetic material 1128 bearing a plurality of permanent magnets 1130. Rotation of the input rotor 1112 around its axis 1124, causes the intermediary rotor 1116 to orbit the axis 1124. This, in turn, causes the intermediary rotor 1116 to rotate about its central axis 1122, as a result of the magnetic coupling between the pluralities of permanent magnets 1126 and 1130, caused by the varying radial airgap between them. It can be appreciated that the intermediary rotor 1116 bears, at an output end, that is, in the second stage 1104 of the magnetic gear 1100, a second set of permanent magnets 1132 comprising a predetermined number of permanent magnets. The second stage 1104 of the magnetic gear 1100 comprises an output rotor 1134 bearing a plurality of permanent magnets 1136. The rotation of the intermediary rotor 1116 around the axis 1122 causes the rotation of output rotor 1134 around axis 1124 as a result of the magnetic coupling between the pluralities of permanent magnets 1132 and 1136 caused by the varying radial airgap between them. It can be appreciated that the outer rotor 1134 is mounted to a respective output portion 1138 of the shaft 1120 via a bearing 1140. The output portion 1138 is coaxial with the input rotor 1112 and, therefore, shares the common axis 1124.

The contour of the intermediary rotor 1116, formulated from the centre of the stator 1118 or output rotor 1134, can be approximated as a sinusoidal profile:

$$r = r_{av} + r_b \cos(\theta) \quad (6)$$

Therefore, the flux-density in the outer bore of the gear in stage 1 or stage 2, due to the intermediary rotor magnets 1126 or 1132, can be written as:

$$B_{1,2} = B_m \cos(pp_{1,2}\theta)[\lambda_0 + \lambda_1 \cos(\theta)] \quad (7)$$

$$= B_m \cos(pp_{1,2}\theta)\lambda_0 + \frac{1}{2}B_m\lambda_1 \cos((pp_{1,2}+1)\theta) +$$

$$\frac{1}{2}B_m\lambda_1 \cos((pp_{1,2}-1)\theta)$$

where the subscripts 1 and 2 denote the $1^{st}$ and $2^{nd}$ stages of the permanent magnets respectively.

Therefore, harmonics with pole-pairs of $(pp_{1,2}+1)$ and $(pp_{1,2}-1)$ are created at the outer magnets 1130 and 1136 of each stage of the magnetic gear 1100. The former harmonic is generally larger than the latter. Hence, $qq_{1,2}=pp_{1,2}+1$ are been selected for realising such a magnetic gear 1100.

Gear Ratio

Equation (7) can be written as a function of time to give:

$$B_{1,2} = B_m \cos(pp_{1,2}(\theta - \omega_m t))[\lambda_0 + \lambda_1 \cos(\theta - \omega_{in} t)] \quad (8)$$

$$= \ldots + B_m\lambda_1 \cos(pp_{1,2}(\theta - \omega_m t))\cos(\theta - \omega_{in} t)$$

$$= \ldots + \frac{B_m\lambda_1}{2}\cos[(pp_{1,2}-1)\theta + (\omega_{in} - pp_{1,2}\omega_m)t] +$$

$$\frac{B_m\lambda_1}{2}\cos[(pp_{1,2}+1)\theta - (\omega_{in} + pp_{1,2}\omega_m)t]$$

where $\omega_m$ is the speed of the intermediary rotor 1116 and $\omega_{in}$ is the speed of the input shaft 1112 (high-speed rotor).

Stage 1: in order for the harmonic of order $(pp_1+1)$ to couple with the static field of the stator magnets 1130, the relationship between the rotor speeds can be derived as follows:

$$\omega_{in} = -\frac{\omega_{in}}{pp_1} \qquad (9)$$

Stage2: In order for the harmonic of order $(pp_2+1)$ to couple with the field of the magnets 1136 on the output rotor 1134, which rotates with a speed of $\omega_{out}$, the following equation must hold:

$$(\omega_{in}+pp_2\omega_m)=(pp_2+1)\omega_{out} \qquad (10)$$

which results in $$\omega_{out} = \frac{1}{(pp_2+1)}\omega_{in} + \frac{pp_2}{(pp_2+1)}\omega_m \qquad (11)$$

Overall Gear Ratio:

Combining equations (9) and (11) results in the overall gear ratio of the 2-stage harmonic gear given by equation (12)

$$\omega_{out} = -\frac{\frac{pp_2}{pp_1}-1}{(pp_2+1)}\omega_{in} \qquad (12)$$

An embodiment of a magnetic gear as depicted in FIG. 11 was realised using the parameters of table 3 below. It can be appreciated from the eccentricity value and the minimum air gap value that the maximum air gap value is 6 mm.

TABLE 3

Values of parameters for the harmonic gear of FIG. 11.

| Parameter | Description | Value | |
|---|---|---|---|
| e | eccentricity (distance between centres of high-speed rotor and stator) | 5 | mm |
| pp₁ | Number of pole-pairs on intermediary rotor in stage 1 | 20 | |
| qq₁ | Number of pole-pairs on stator | 21 | |
| pp₂ | Number of pole-pairs on intermediary rotor in stage 2 | 21 | |
| qq₂ | Number of pole-pairs on output rotor | 22 | |
| Ro | Outer radius | 85 | |
| Gap_min | Minimal length of air-gap | 1 | mm |
| Lpm | Magnet thickness | 5 | mm |
| Liron | Thickness of back-iron | 5 | mm |

The gear ratios related to the harmonic gear with the parameters given in table 3 are shown in table 4.

TABLE 4

Gear ratios of harmonic gear

| G₁ | Gear ratio of 1ˢᵗ stage of gear, $\omega_{in}/\omega_{in}$ | 20 |
|---|---|---|
| G₂ | Overall gear ratio of harmonic gear, $\omega_{in}/\omega_{out}$ | 440 |

It can be appreciated that relatively high gear ratios can be realised.

Figure 12:
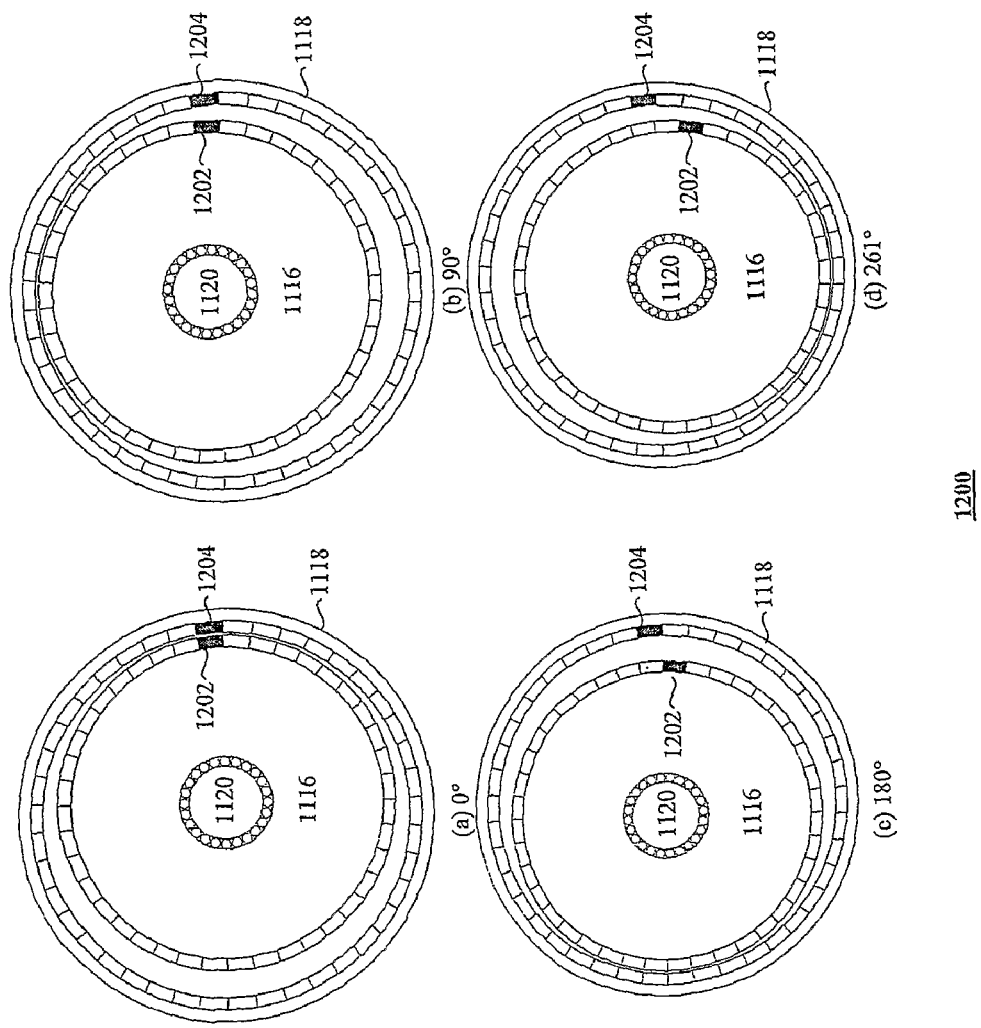
FIGS. 12(a) to (d) illustrate the operation of an embodiment of a magnetic gear.

Referring to the first stage 1102 of the magnetic gear 1100 of FIG. 11, the shaft 1120 and the intermediary rotor 1116 rotate in opposite directions. Therefore, an anticlockwise rotation of the shaft 1120 results in a clockwise rotation of the intermediary rotor 1116 and visa versa. This rotation is demonstrated schematically by FIGS. 12(a) to 12(d). Referring to FIG. 12(a), two permanent magnets 1202 and 1204 are identified as reference points. They are associated with the intermediary rotor 1116 and the stator 1118 respectively. These permanent magnets are arbitrarily selected as being aligned at 0° prior to rotation of the shaft 1120. The mutual positions of the two permanent magnets 1202 and 1204 can be seen to have changed slightly when the shaft has been rotated 90° anticlockwise such that the permanent magnet 1202 of the intermediary rotor 1116 has moved slightly in the clockwise direction relative to the permanent magnet 1204 of the stator 1118 as can be appreciated from FIG. 12(b). Referring to FIG. 12(c), the shaft 1120 has rotated through 180° and the permanent magnet 1202 of the intermediary rotor 1116 has moved even further away in a clockwise direction from the permanent magnet 1204 of the stator 1118. Referring to FIG. 12(d), the shaft 1120 has rotated through 261° and the permanent magnet 1202 of the intermediary rotor 1116 has moved still further away in a clockwise direction from the permanent magnet 1204 of the stator 1118.

Figure 13:
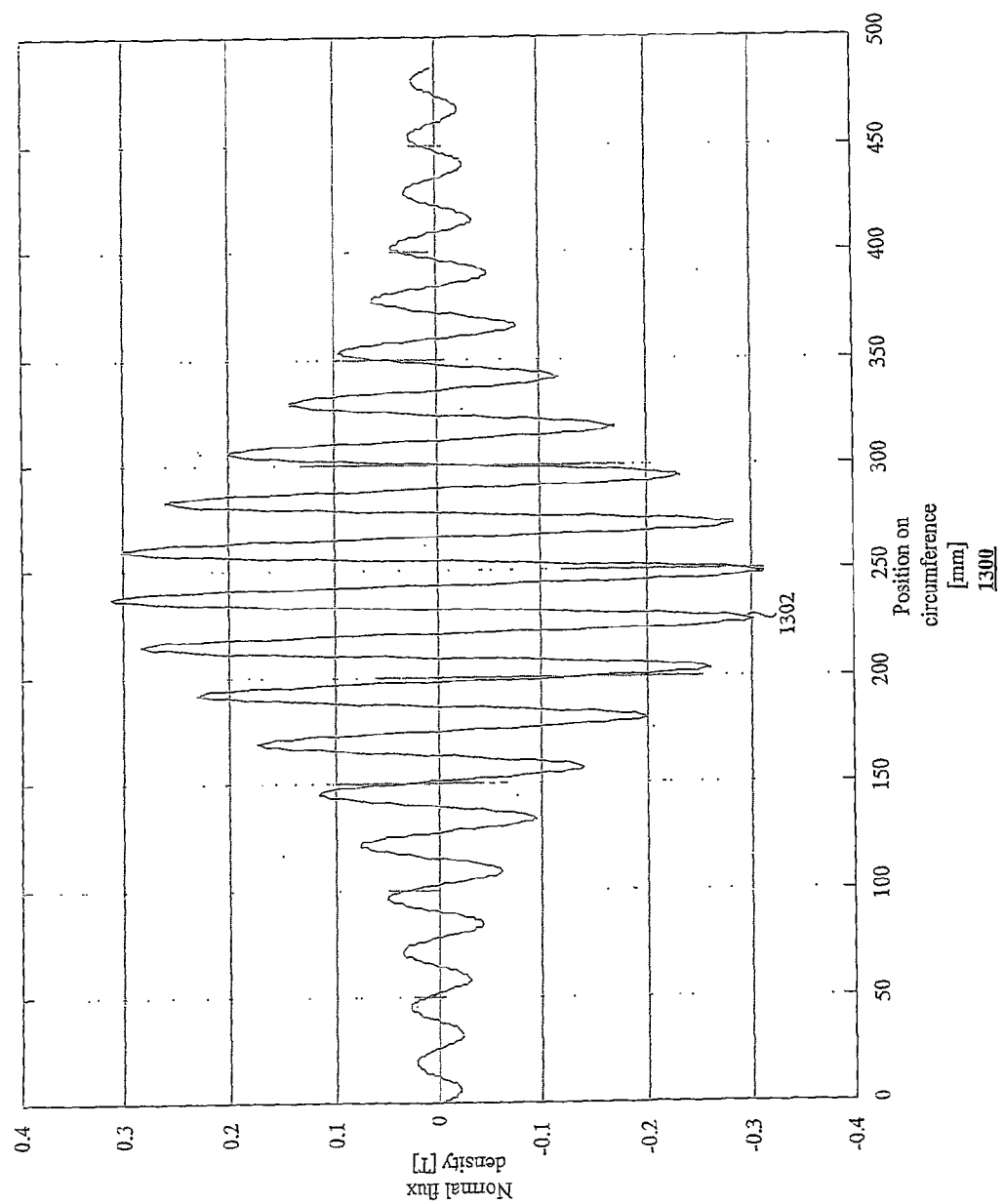
FIG. 13 depicts circumferential variation of normal flux density clue to movement of an intermediary rotor for a given point at the centre of a stator magnet according to an embodiment.

A mathematical model of the first stage 1102 of the magnetic gear 1100 of FIG. 11 was produced and simulations of the variations in the magnet fields were investigated. FIG. 13 illustrates circumferential variation of the normal flux density due to movement of the intermediary rotor 1116 for a given point at the centre of a stator magnet such as the above described stator magnet 1204. It can be appreciated that the intermediary rotor 1116 that is eccentrically positioned relative to the stator axis 1124 results in a varying air gap, which, in turn, results in a complex spatially distributed magnetic field 1302 that enables magnetic coupling/torque transmission between the permanent magnets 1126 and 1130.

Figure 14:
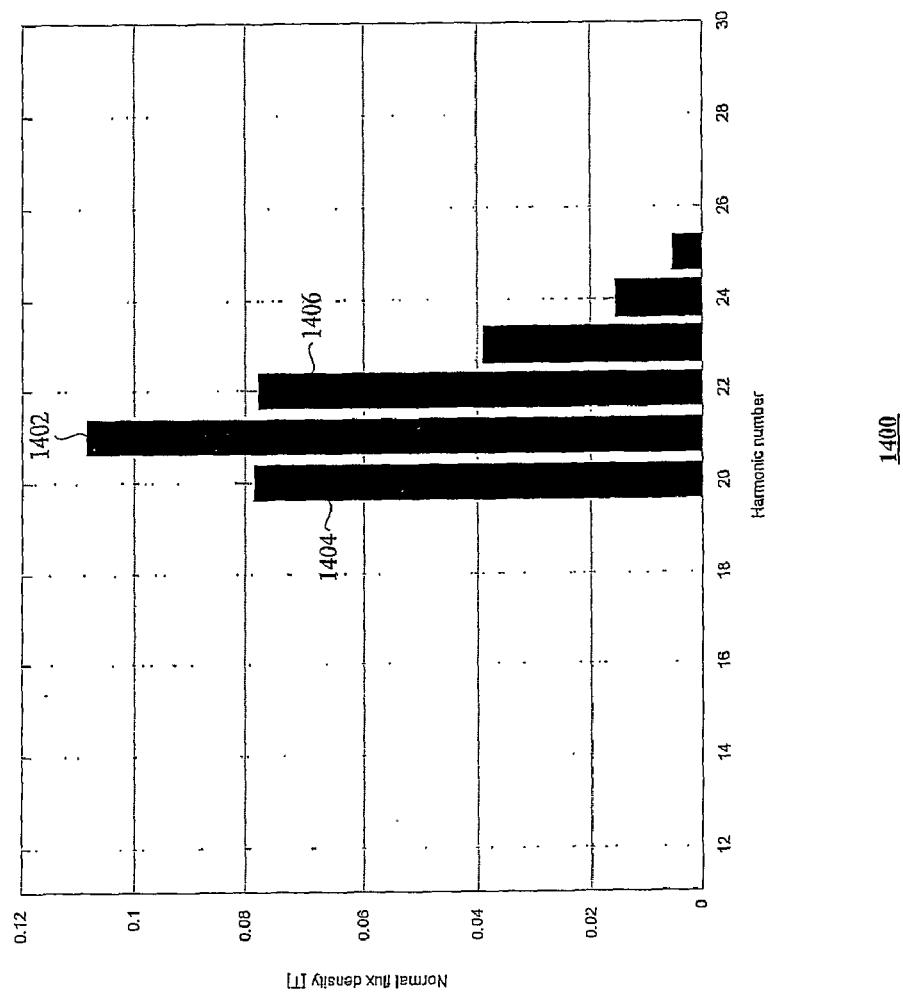
FIG. 14 shows a magnetic harmonic spectrum of the waveform of FIG. 13.

FIG. 14 illustrates the magnetic harmonic spectrum 1400 of the waveform 1302 depicted in FIG. 13. It can be appreciated that the 21st harmonic 1402 is dominant. Referring to the second stage 1104 of the magnetic gear 1100 of FIG. 11, the shaft 1120 and the intermediary rotor 1116 rotate in opposite directions and the intermediary rotor 1116 and the output rotor 1134 rotate in the same direction but at different rates of rotation, that is, in a geared manner. Therefore, an anticlockwise rotation of the shaft 1120 results in a clockwise rotation of the intermediary rotor 1116 and the output rotor 1134 and visa versa. This rotation is demonstrated schematically by FIGS. 15(a) to 15(d).

Figure 15:
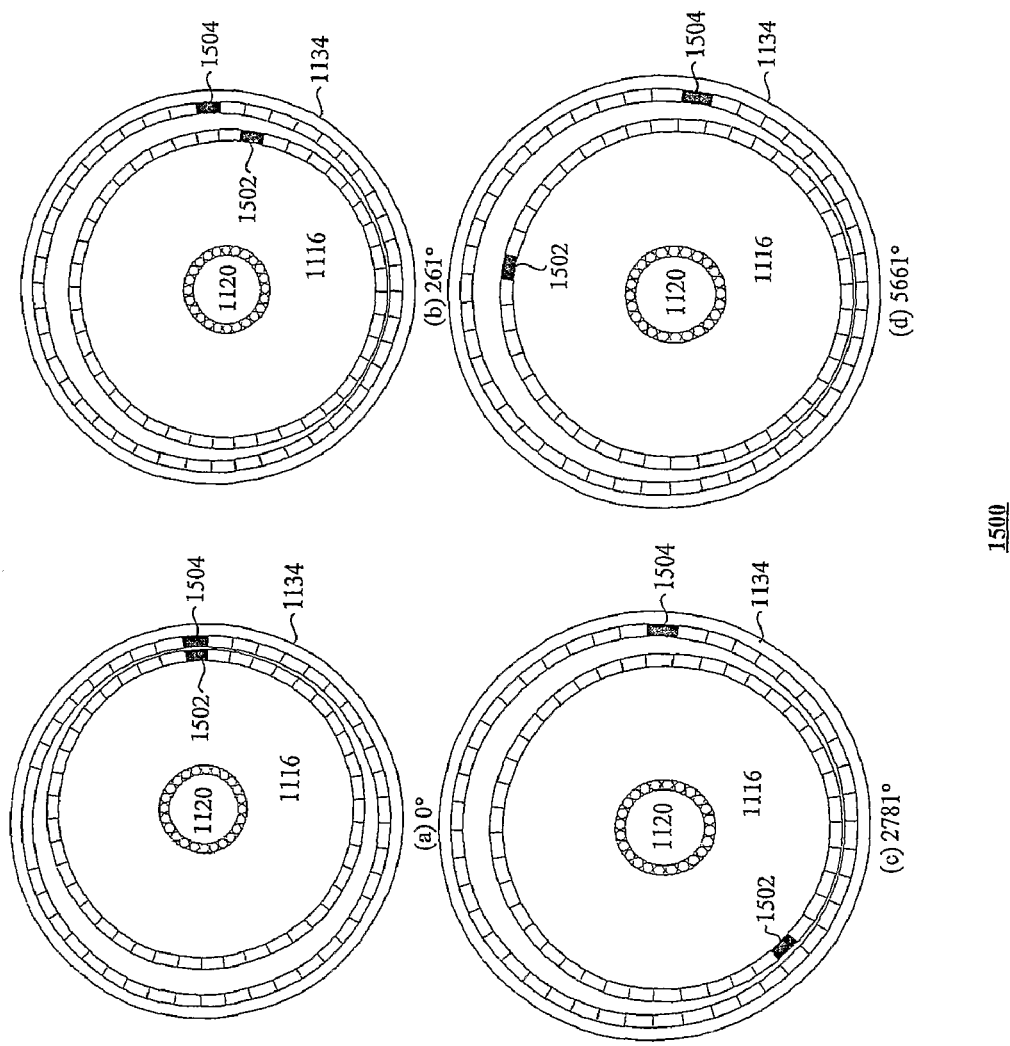
FIGS. 15(a) to (d) illustrate the gearing of a magnetic gear according to an embodiment.

Referring to FIG. 15(a), two permanent magnets 1502 and 1504 are identified as reference points. They are associated with the intermediary rotor 1116 and the output rotor 1134 respectively. These permanent magnets are arbitrarily selected as being aligned at 0° prior to rotation of the shaft 1120. The mutual positions of the two permanent magnets 1502 and 1504 can be seen to have changed slightly when the shaft has been rotated 261° anticlockwise such that the permanent magnet 1502 of the intermediary rotor 1116 has moved clockwise to a greater extent than the permanent magnet 1504 of the output rotor 1134 has moved clockwise as can be appreciated from FIG. 15(b). Referring to FIG. 15(c), the shaft 1120 has rotated through 2781' and the permanent magnet 1502 of the intermediary rotor 1116 has moved even further in a clockwise direction as compared to the permanent magnet 1504 of the output rotor 1134. Referring to FIG. 15(d), the shaft 1120 has rotated through 5661' and the permanent magnet 1502 of the intermediary rotor 1116 has moved still further in a clockwise direction as compared to the permanent magnet 1504 of the output rotor 1134. It can be appreciated that the gearing between the rotation of the input shaft 1120 and the rotation of the output rotor 1134 is extremely large to the extent that the output rotor 1134 has rotated about 5° as compared to the 5661° of rotation of the input shaft 1120. Therefore, extremely high and precise gearing can be realised using embodiments of the present invention.

Also, although the above embodiments have been described with reference to radial field rotors and rotation, embodiments can equally well be realised using axial field rotors and rotation as well as translators and translation, that is, the principles of embodiments of the present invention can be realised in the context of linear gears.

The above embodiments have been described with reference to the inner rotor driving the outer rotors. However, it will be appreciated that embodiments can be realised in which an outer rotor drives an inner rotor thereby reversing the gear ratio.

The invention claimed is:

1. A magnetic gear comprising first and second rotatable members having associated first and second pluralities of permanent magnets respectively arranged such that the first and second pluralities of permanent magnets are separated by a spatially varying radial air gap that modulates the fields of both of the first and second pluralities of permanent magnets resulting in asynchronous harmonics that produce magnetic coupling therebetween in a geared manner, wherein the first rotatable member comprises a third plurality of permanent magnets and the gear comprises a stator bearing a fourth plurality of permanent magnets, the third and fourth pluralities of permanent magnets are separated by a spatially varying radial air gap that modulates the fields of both of the third and fourth pluralities of permanent magnets resulting in asynchronous harmonics that produce magnetic coupling therebetween in a geared manner.

2. A magnetic gear as claimed in claim 1 in which the first and second rotatable members are mounted eccentrically relative to one another.

3. A magnetic gear as claimed in claim 1 in which the first rotatable member magnetically induces a rotational motion in the second rotatable member.

4. A magnetic gear as claimed in claim 1 in which the first rotatable member is mounted on a shaft eccentrically coupled to an input rotor.

5. A magnetic gear as claimed in claim 1 in which the second rotatable member is mounted on an output portion of the shaft that is coaxial with the input rotor.

6. A magnetic gear as claimed in claim 1 in which the first and second pluralities of permanent magnets are rotatable about respective non-collinear axes.

7. A magnetic gear as claimed in claim 1 in which the first rotatable member is arranged to rotate about a first axis of a shaft and the second rotatable member is rotatable about a second axis; the first axis being arranged to precess about the second axis.

8. A magnetic gear as claimed in claim 1 in which the first rotatable member is eccentrically rotatable relative to the stator and rotatable about a first axis.

9. A magnetic gear as claimed in claim 8 in which the first axis is arranged to orbit a second axis.

10. A magnetic gear as claimed in claim 1 in which the varying distance is given by $r = r_{av} + r_b \cdot \cos(nn\theta)$, where $r_{av}$ is the average radius and $r_b$ is the maximum deviation from the average and nn is an integer.

* * * * *